United States Patent
Evans

3,810,384
May 14, 1974

[54] ULTRASONIC PIPELINE INSPECTION DEVICE

[76] Inventor: Dwight J. Evans, 4107 E. 49th, Tulas, Okla. 74135

[22] Filed: Feb. 1, 1971

[21] Appl. No.: 111,550

[52] U.S. Cl. ............................................... 73/67.8 S
[51] Int. Cl. ............................................. G01n 29/04
[58] Field of Search ............. 73/67.8, 67.8 S, 67.9, 73/67.5, 67.6, 67.7, 71.5 U; 181/.5 BE; 324/37, 40

[56] References Cited
UNITED STATES PATENTS

| | | | |
|---|---|---|---|
| 3,285,059 | 11/1966 | Bogle | 73/67.9 |
| 3,509,752 | 5/1970 | Moore | 73/67.9 |
| 3,600,613 | 8/1971 | Clarke | 73/67.8 S X |
| 3,437,810 | 4/1969 | Wood et al. | 324/37 X |
| 3,375,706 | 4/1968 | Pandelis et al. | 73/67.9 |
| 3,533,281 | 10/1970 | Hetherington | 73/71.5 U |
| 3,021,706 | 2/1962 | Cook et al. | 73/67.8 S |
| 2,921,126 | 1/1960 | Street et al. | 73/67.6 X |
| 3,064,127 | 11/1962 | Green et al. | 324/37 UX |
| 3,483,466 | 12/1969 | Crouch et al. | 324/37 |
| 3,496,457 | 2/1970 | Proctor et al. | 324/37 |

*Primary Examiner*—James J. Gill
*Attorney, Agent, or Firm*—Head & Johnson

[57] ABSTRACT

Ultrasonic instrumentation is incorporated into a self-contained and self-propelled unit capable of traversing through generally inaccessible pipe such as a buried pipeline to provide a record of pipe wall thickness variation and/or defects or other abnormalities which may exist in the pipeline under examination. The information is correlated to the rate of travel of the unit and with other orientation means, such as the physical configuration of the pipeline, fittings, valves, etc., to properly determine the location of any such abnormalities.

9 Claims, 10 Drawing Figures

PATENTED MAY 14 1974

3,810,384

INVENTOR.
DWIGHT J. EVANS

BY Head & Johnson

ATTORNEYS

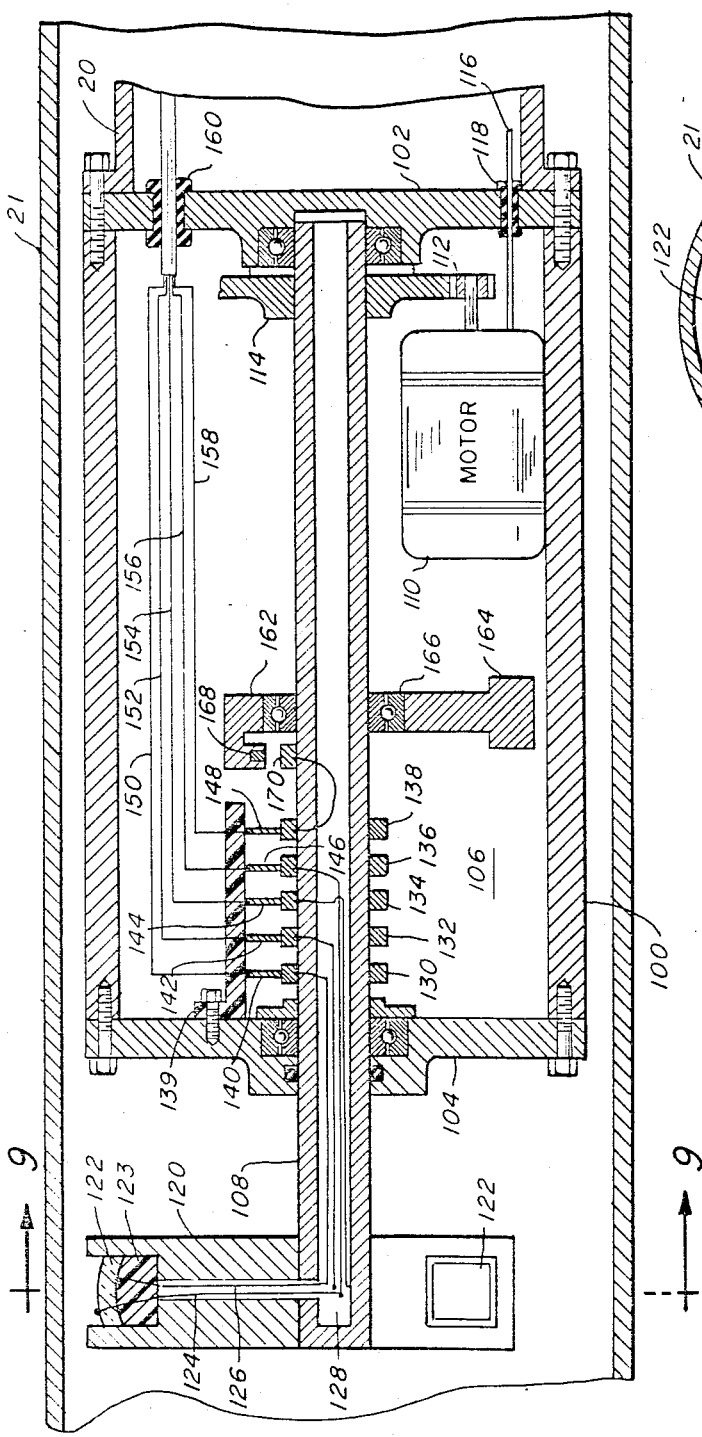
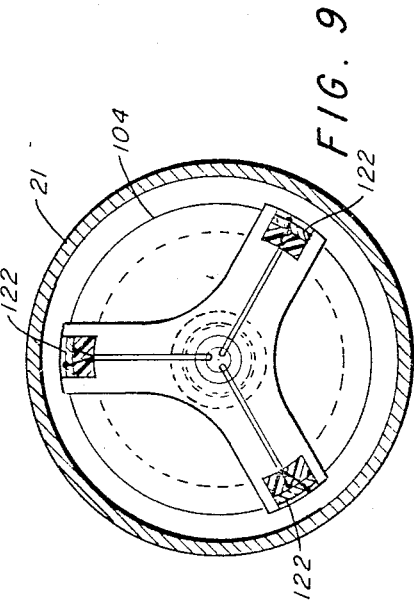
FIG. 8
FIG. 9
INVENTOR.
DWIGHT J. EVANS
BY Head & Johnson
ATTORNEYS

ULTRASONIC PIPELINE INSPECTION DEVICE

BACKGROUND

Owners and operators of pipelines find it economically and efficiently desirable to provide periodic inspection of buried pipelines to determine wall thickness and location of defects or abnormalities for safety purposes and to prevent escape of fluids which will pollute or contaminate the environment in areas where the pipelines exist.

Many devices have been provided within the art for inspecting and locating pipeline abnormalities. Such devices have used acoustics, magnetic means and ultrasonics. This invention relates to the use of ultrasonics in such inspection. Some of the problems in using ultrasonics in such pipeline inspection systems are the fact that adequate contact or coupling must be maintained between the ultrasonic transducer and the material under test and that the space between the transducer and the material must be maintained constant. A self-contained ultrasonic device traveling within the pipe will tend to roll and/or yaw or otherwise not maintain axial alignment with the pipe because of irregularities, bends, couplings, welds, and other internal variations which cause irratic results. Additionally, it is highly desirable to obtain other information about the pipe such as flaws, poor welds, cracks or incipient cracks therein in addition to thickness.

SUMMARY

Accordingly, this invention has for its object to provide a pipeline fluid propelled device or "pig" which overcomes the problems heretofore existent in other ultrasonic inspection devices. The apparatus of this invention utilizes the transported fluid of the pipeline as the coupling medium while variations in the distance from the pipe wall through the coupling fluid are compensated by an "automatic zero" circuitry. Such a circuit is in essence a variable time delay device which delay is determined by the distance of the transducer from the I.D. of the pipe surface. The circuitry measures only the time interval required to traverse the pipe wall thickness and hence this time interval is proportional to the thickness or distance to a flaw, crack or other abnormality. Typical of such coupling fluids are the hydrocarbons such as gasoline, oil, liquefied petroleum gas (LPG) or water which surrounds the transducer assembly exposed thereto at all times. A direct reading output or read-out information for a computer is provided by phonographic, e.g., magnetic, recorder contained in the device.

The invention further involves and provides two embodiments of the transducer assembly for determining thickness and/or locating cracks and flaws, one a circumferential fixed ring of transducers, the other a rotating transducer assembly.

BRIEF DESCRIPTION OF THE DRAWINGS

FIG. 8 depicts a rotating transducer assembly for use with the apparatus of FIG. 1 for determining wall thickness of the pipe.

FIG. 9 is a sectional view taken along the line 9—9 of FIG. 8.

DETAILED DESCRIPTION OF THE PREFERRED EMBODIMENTS

Figure 1:
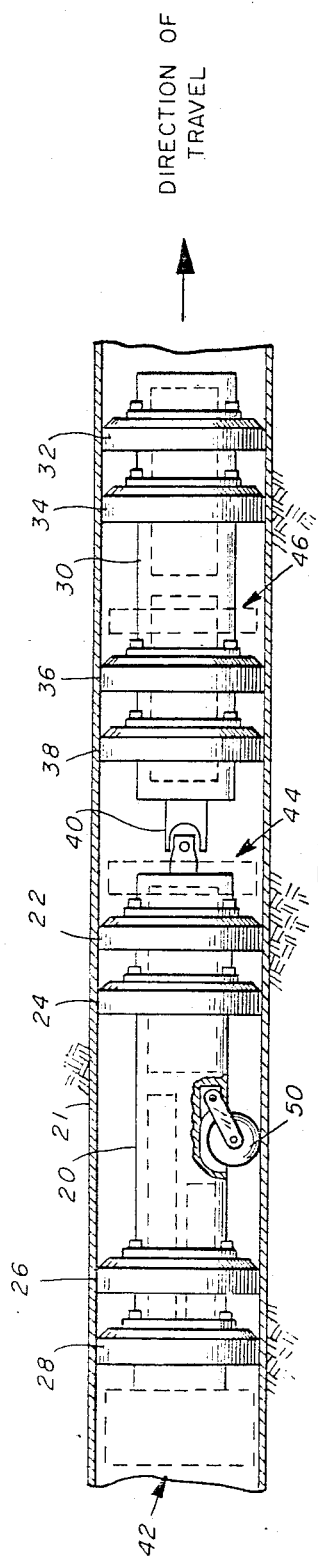
FIG. 1 is an overall sectional view of the traveling pipeline pig assembly of this invention.

Referring now to FIG. 1, an overall view of the apparatus to be used in conjunction with this invention is depicted. The device includes a basic housing 20 which is adapted to contain all of the essential circuitry, battery pack or other source of electrical energy for operating the transducers, operating the circuit, recording apparatus, etc., necessary for use in the operation of the invention. The housing assembly or "pig" is supported within the pipeline and is translated therethrough by a plurality of resilient cups 22, 24, 26 and 28 which in this view are oriented so as to cause the housing to travel from left to right with the flow of fluids within the pipeline. Rate of travel of the housing may be controlled by automatic braking devices or by pipeline fluid by-passing. Such cups are well known in the art as being shaped so as to entrap the fluid moving within the pipeline and move the instrumented housing assembly therethrough in a conventional manner. In order to reduce handling weight and/or length of the pipeline housing assembly and to permit travel around curves and bends, one or more additional housings 30 may be attached to the forward or trailing end of the pipe 20. Likewise, housing 30 includes a plurality of resilient cups 32, 34, 36 and 38. The units are interconnected by a universal joint type coupling 40. Preferably the trailing end of the housing assembly 20 includes a transducer assembly shown by dotted outline of the type hereinafter described and generally designated by the numeral 42. However, it is to be understood that the thickness or flaw inspection devices or transducer assemblies as herein described may be located as for example shown at 44 or 46. The speed and/or distance of travel of the assembly may be measured by at least one rotating wheel assembly 50 which is biased to maintain contact with the inner periphery of the pipe and so connected to provide not only a recorded output for correlating the location of the pig to the transducer read-out but also provide electrical output for synchronizing recorder drive speed and ultrasonic transducer operation or rotation.

Figure 3:
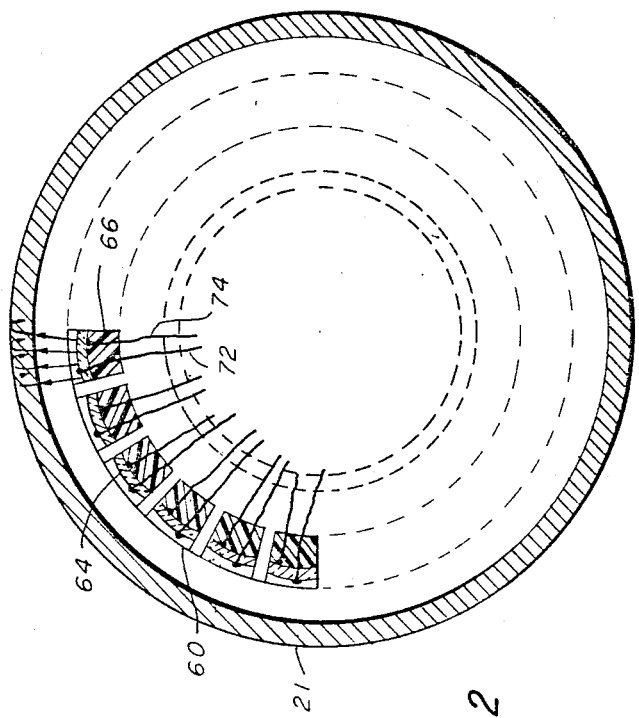
FIG. 3 is a sectional view taken along the line 3—3 of FIG. 2.
Figure 2:
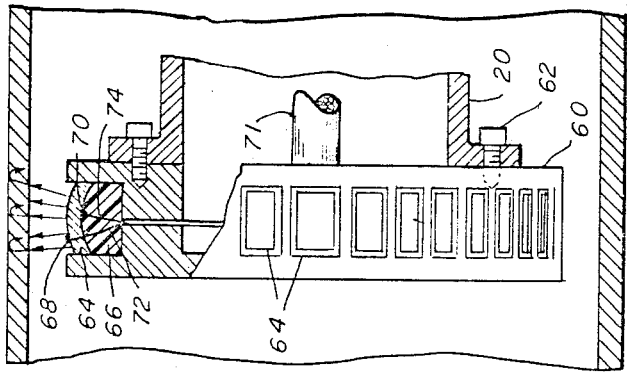
FIG. 2 is a partial sectional side elevational view of a fixed transducer assembly for use in conjunction with the apparatus of FIG. 1.

Referring now to FIGS. 2 and 3 one form of the ultrasonic transducer assembly of this invention is shown and described as a fixed type for transmitting a straight beam of energy for the specific purpose of determining pipe wall thickness. The assembly comprises a circular housing 60 which is adapted to be attached to the pig housing 20 as for example using fasteners 62.

Circumferentially recessed about the outer periphery of the transducer housing 60 are a plurality of ultrasonic transducers 64 which are normally well known electroacoustical devices such as piezoelectric crystals. The crystals are curved convex as shown in both views. The transducer elements are supported and sealed in each recess by an epoxy resin backing 66. The transducer 64 has a pair of electrodes 68 and 70 connected to the crystals in usual manner, e.g., on opposite sides thereof, which electrodes are interconnected with a coaxial transmission line by a pair of wire leads 72 and 74. As is well known in the art of ultrasonics, when an electrical pulse is applied to the electrodes it will cause the physical dimensions of the transducer to rapidly change at a corresponding ultrasonic frequency. These physical changes produce ultrasonic energy which is radiated from the surface of the transducer, as shown by the arrows, outward. This beam of energy is reflected back to the transducer upon encountering an interface as for example a reflection will occur from the inner periphery and outer periphery of the pipe, which signals are then properly recorded utilizing the circuitry of FIG. 10.

Figure 4:
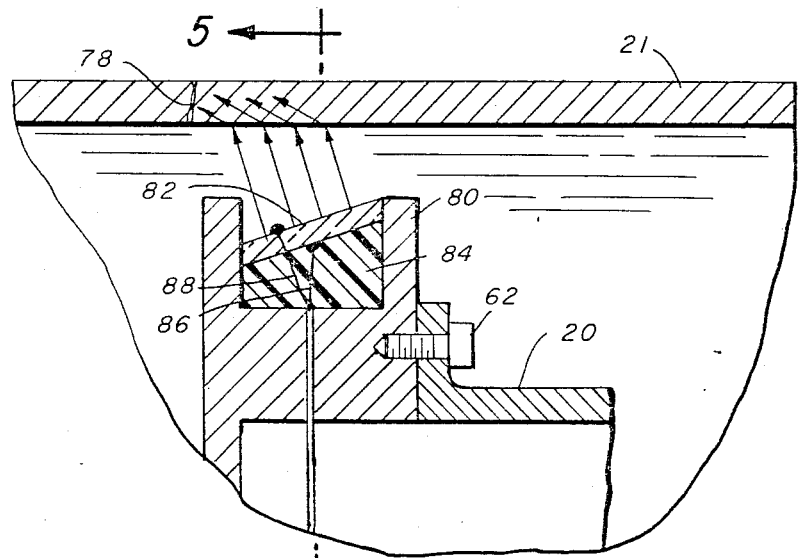
FIG. 4 is a partial side elevational view of a transducer assembly for detecting transverse flaws or defects in the pipeline.
Figure 5:
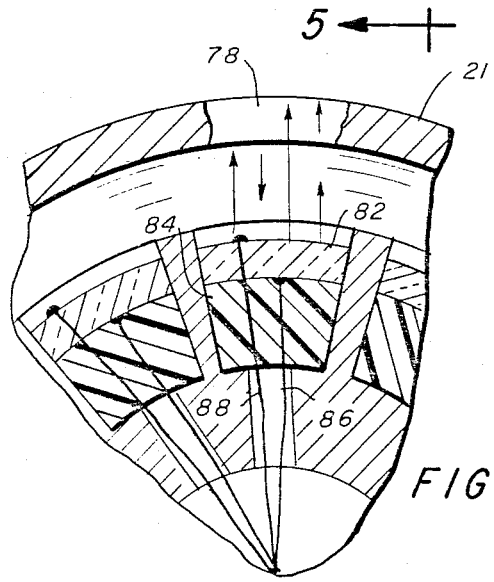
FIG. 5 is a partial sectional view taken substantially along the line 5—5 of FIG. 4.

FIGS. 4 and 5 describe the ultrasonic transducer assembly embodiment adaptable to detect cracks, defects or flaws, such as shown by numeral 78, within the pipe which extend in a direction that would be considered coaxial to the pipeline. In such an embodiment the transducer cylindrical housing 80 is adapted to be attached similar to the previous embodiment to the pig housing 20 in any one of the positions 42, 44 or 46, and includes a transducer 82 oriented about the circumference of the housing 80 so as to be at an angle of approximately 18° to the pipeline. Similar to the previous embodiment, the transducer is supported by a backing 84 and connected by wire leads 86 and 88.

Figure 7:
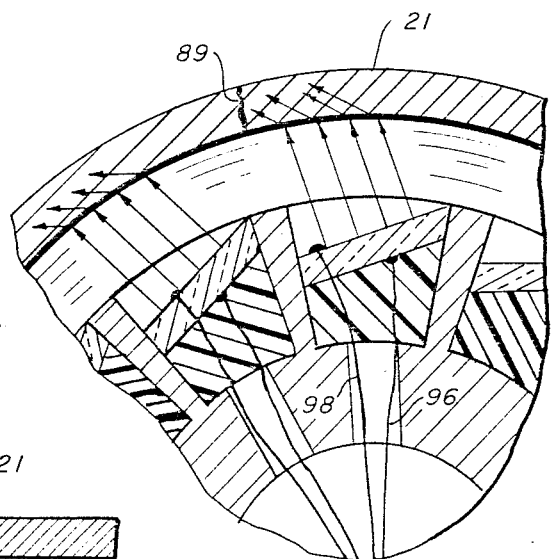
FIG. 7 is a partial sectional view taken substantially along the line 7—7 of FIG. 6.
Figure 6:
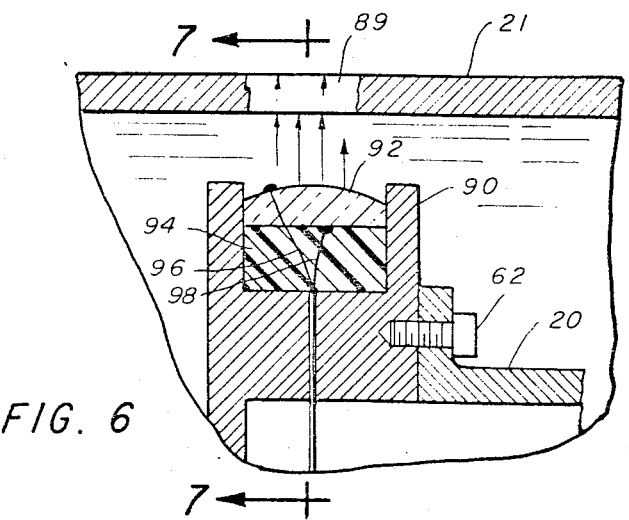
FIG. 6 is a partial side elevational view depicting a fixed transducer assembly for detecting longitudinal flaws or defects in the pipe.

To detect flaws, cracks or defects as shown by numeral 89 which would be considered substantially longitudinal or parallel to the axis of the pipe, or at any angle therebetween, a transducer assembly as shown in FIGS. 6 and 7 may be utilized. Such device is attached to the pig housing 20. In this embodiment the transducer 92 is supported within the cylindrical transducer housing 90 by suitable backing material 94. The transducer is oriented, as shown in FIG. 7, so as to be at a transverse angle to the pipeline of approximately 18° and likewise includes suitable wire leads 96 and 98 to send and receive the ultrasonic energy.

Referring now to FIGS. 8 and 9 a rotating transducer assembly is depicted. This transducer assembly is adapted to be an alternate for determining the thickness of pipe wall 21 and is adapted to be attached to the pig housing 20 in a suitable manner preferably at the trailing end of the pig assembly in the area as shown by the dotted outline 42. The transducer assembly includes a basic housing 100 which is closed by end members 102 and 104 to effectively provide a sealed chamber 106. Sealably and rotatably supported to and through the end members 102 and 104 is shaft 108 which is rotated by a selsyn or synchronous motor 110 via pinion 112 and gear 114 although belts or other drive mechanism may be utilized. Gear 114 is keyed or otherwise attached to shaft 108 to rotate same. The motor is connected electrically to a power supply, such as a synchronous generator 51 driven by wheel 50, not shown in this view, via electrical conduits 116 which are sealed as they pass through the end plate 102 as for example by a grommet 118. Keyed or otherwise attached to the rotating shaft 108 is the rotating transducer assembly housing 120 which, in this instance contains three equally spaced ultrasonic transducers 122 which are connected electrically in a manner as previously described by wires 124 and 126 into a central conduit 128 provided within the shaft 108. Motor 110 being electrically synchronous with generator 51 driven by wheel 50 thus rotates the transducer assembly at a speed proportional to the rate of travel of the device. Depending upon the number of transducers and their physical dimension, the assembly 120 will be caused to rotate, via gears 112 and 114, to effect 100 percent coverage of the pipe circumference as the device travels therethrough. Attached to the shaft internally within chamber 106 are a plurality of slip rings 130, 132, 134, 136 and 138 which respectively connect with one wire from each of the transducers with a common lead from each transducer attached to a respective slip ring 136. A rack 139 supports electrical brushes 140, 142, 144, 146 and 148 which ride upon and electrically connect the respective slip rings. Wire leads 150, 152, 154, 156 and 158 connect the respective brushes and extend outward of the sealed chamber 106 as for example through a seal or grommet 160 to the control circuitry hereafter described.

An orientation device 162 includes a pendulum 164 which is rotatably supported via bearings 166 to the rotating shaft 108. A permanent magnet 168 is supported to the orientation device relative to a wire coil 170 attached to the rotating shaft to provide a means for recording each revolution.

OPERATION

In describing the operation of this invention, it is to be understood that although the description relates to the rotary wall thickness transducer embodiment shown in FIGS. 8 and 9 and the use of one or more flaw detection transducer assemblies as shown in FIGS. 4 through 7, any combination of such transducer systems may be utilized according to the information desired.

Figure 10:
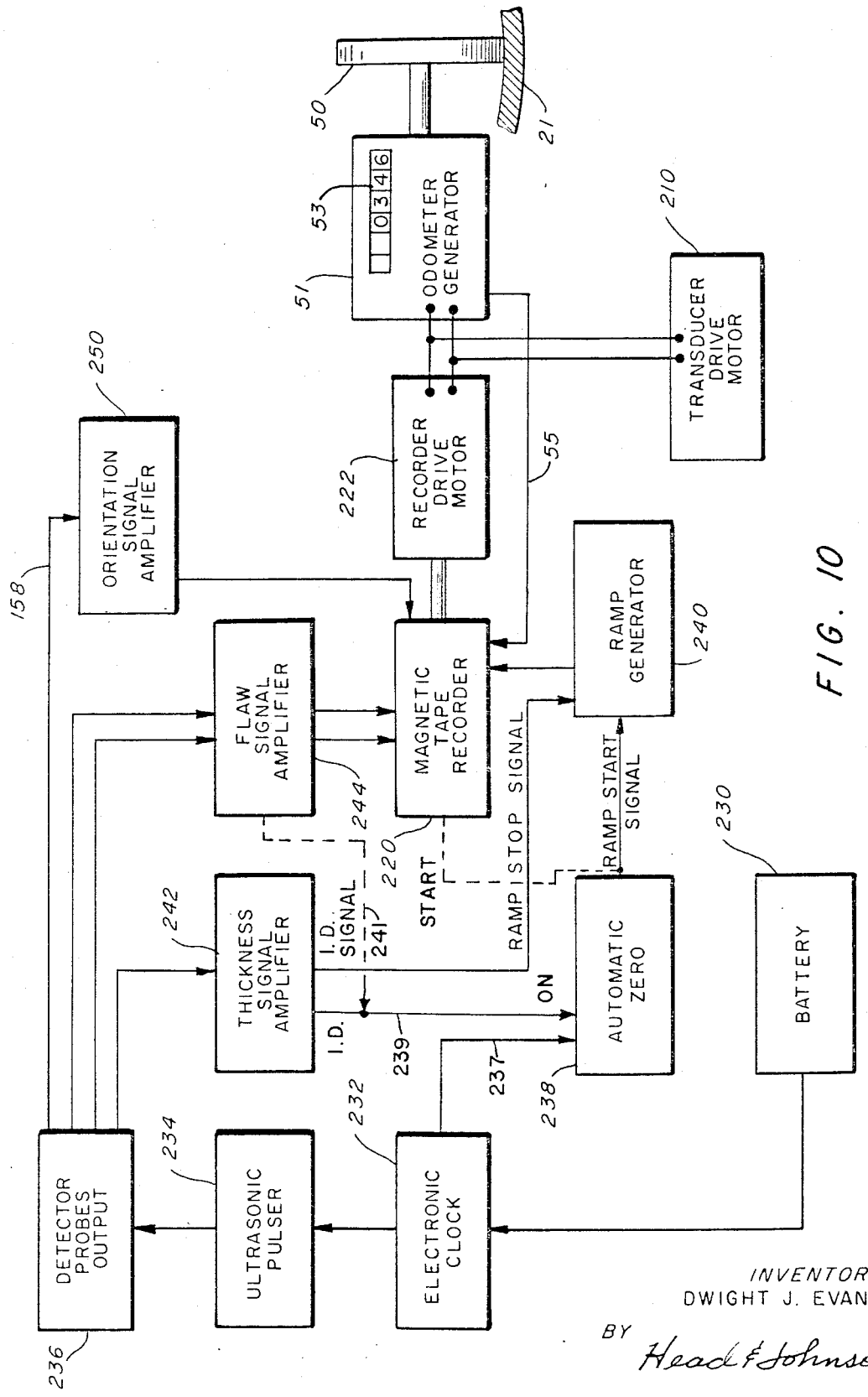
FIG. 10 is a schematic circuit diagram for use in conjunction with the apparatus of this invention.

Preferably the circuitry and power supply of FIG. 10 is incorporated within the housing 20. The combination odometer 53 and synchronous generator 51 is actuated by the travel of wheel 50 along the pipeline. The odometer-generator is adapted to: (1) provide a direct indication of distance the housing has traveled as, for example, in 100 feet intervals, by a signal 55 recorded on tape 220 and/or by a visual counter 53; and/or (2) generate voltage sufficient to drive and/or synchronize the speed of magnetic tape recorder 220 by motor 222 proportional or relative to the rate of travel of the pig and transducers in the pipe. In the event the rotary transducer embodiment of FIGS. 8 and 9 is utilized this same odometer-generator voltage is adapted to drive motor 110 which in turn rotates the transducers in synchronism to the rate of pig travel. Using three transducers, as shown, a gear ratio between the pinion and gear 112 and 114 of about one-third a revolution of the transducer housing 120 is produced for each inch of travel along the pipeline. As the number of transducers varies so will the ratio of RPM to line travel vary. In some instances a plurality of odometer-generator drive wheels 50 are used to insure reliability of travel rate and distance of the device. In operation a power supply 230 drives electronic clock 232 which in essence is adapted to start the ultrasonic pulsing circuit 234 and generally synchronize the whole transmitting and recording circuitry. The desired electrical energy is transmitted to the ultrasonic transducers. An additional signal 237 from the clock 232 is provided to what is called an "automatic zero circuit" or monostable multivibrator (flip-flop) 238. Creates an off or inactive recording situation of a recording circuitry. Once a reflected signal from the I.D. of the pipe wall is received either from one or both of the thickness or flaw amplifiers 242 and/or 244, an amplifier signal is utilized via connection 239 to activate or turn on the recording situation of the circuit. That is, the signal is adapted to delay the start of the sweep or ramp generator 240 as a function of the time the signal traverses the pipe wall without regard for the transducer spacing from the wall. The reflected signal from the pipe is picked up by the transducer and amplified by circuit 242. The amplified signal is then sent to the sweep or ramp generator 240 and effectively stops the sweep signal to effectively provide a voltage output for submission to the magnetic recorder 220 which is a direct function of the pipe wall thickness. Likewise the reflected signal from the flaw detection transducer assemblies is amplified by the circuit 244 which output signal is transmitted to the recorder 220. In order to properly orient the thickness measurement with the transducer location, the signal from the orientation coil 170 (FIG. 8) is transmitted via conduit 158 to amplifier 250 which amplified signal is then recorded for future reference.

MODIFICATIONS

In utilizing the fixed transducer assembly for measuring thickness of pipe as shown in FIGS. 2 and 3 there will be no transducer drive motor 210 within the circuitry. Otherwise the circuit shown in FIG. 10 will be substantially the same. In this instance, the ultrasonic circuitry and instrumentation would "sample" between each of the circular arranged transducers. Such a time interval may be for example on the order of 10-20 microseconds. This will allow sufficient time for an ultrasonic pulse repetition rate of around 1,000 microseconds or more. Sampling or switching rate from one transducer to the next is proportional to the rate of travel of the housing by utilizing voltage from odometer-synchronous generator 51 as a function of the travel of wheel 50.

As shown in the several views the transducer crystals are curved or convex to the pipe wall in order to compensate for any changes in axial location of the transducer as it moves through the pipeline and to further match the curvature of the I.D. of the pipeline. Preferably the housed assembly is sealed with an inert gas therein such as argon at a pressure in excess of the maximum pipeline fluid pressure as a safety measure.

Although in most instances of use the pipeline fluid being normally transported will suffice for adequate coupling of the transducers to the pipe wall it should be understood that special "slugs" of coupling fluid can be introduced before, with and/or after the housed assembly is inserted into the pipeline.

The transducers in the rotary embodiment of FIGS. 8 and 9 may be mounted at any desired angular relationship (e.g., FIGS. 4, 5, 6 and 7) and hence become a rotary flaw detection system which can be used alone or with the device of FIGS. 2 and 3 or the device of FIGS. 8 and 9.

Although a friction drive wheel 50 of odometer-generator 51 is shown, this is merely one means to accomplish the function described herein. Other means such as fluid propeller driven generators are inclusive of use herein.

Although the above invention has been presented in particular detail, it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation. For example, although the description is related specifically to use with buried pipelines, the apparatus is also adaptable to any pipe inspection for oil well casing or tubing, boiler or heat exchange tubing or pipe located on or above the ground.

What is claimed is:

1. Apparatus for determining pipe wall thickness comprising:
   a housing;
   fluid sealing means associated with said housing to cause same to travel through said pipe by the force of the fluid flowing therein;
   a plurality of ultrasonic transducers rotatably attached to said housing to transmit energy pulses into said pipe and to receive reflected signals from an abnormality and/or the I.D. and O.D. of said pipe;
   means within said housing to rotate said transducers in a plane transverse to the axis of travel and as a function of the rate of travel of said housing;
   circuit means carried and contained within said housing to cause transmission of said energy pulses, to receive said reflected signals, and convert said reflected signals to a signal which is a direct relationship of presence of said abnormality and/or the distance between said I.D. and said O.D. of said pipe without regard to the locus of said transducers relative to said pipe wall; and
   means to record said converted signal as a direct relationship to the rate of travel of said housing and location along said line of travel of said transducers at the time said signals are reflected.

2. Apparatus of claim 1 wherein said transducers are three in number and are substantially equally spaced within the same plane of reference.

3. Apparatus of claim 1 wherein said transducer is located adjacent the trailing end of said housing.

4. Apparatus of claim 1 including means to detect and record each revolution of said transducer.

5. Apparatus of claim 1 including in combination therewith, ultrasonic transducer means attached to said housing to transmit energy pulses into said pipe wall and to receive reflected signals representing flaws in said pipe wall, means to cause transmission of said pulses and means to record said reflected signals.

6. Apparatus of claim 5 wherein said transducer means comprises:
   a first plurality of ultrasonic transducers circumferentially spaced about said housing and oriented to transmit energy pulses at one angle into said pipe to detect substantransverse flaws or defects in said pipe;

a second plurality of ultrasonic transducers spaced about said housing and oriented to transmit energy pulses at another angle into said pipe to detect substantially longitudinal flaws or defects in said pipe; and a third plurality of ultrasonic transducers spaced about said housing and oriented to transmit ultrasonic energy pulses angularly into said pipe to detect flaws in said pipe other than substantially transverse or substantially longitudinal.

7. Apparatus for determining pipe wall thickness comprising:

a housing;

fluid sealing means associated with said housing to cause same to travel through said pipe by the force of the fluid flowing therein;

a plurality of ultrasonic transducers circumferentially spaced and supported by said housing in a plane transverse to the axis of travel to transmit energy pulses outwardly into said pipe and to receive reflected signals from an abnormality and/or the I.D. and O.D. of said pipe;

means supported to said housing to detect and record the location of said housing travel;

circuit means carried and contained within said housing to sequentially switch each of said transducers to cause transmission of said energy pulse, to receive said reflected signals including a signal from said I.D., a signal from said O.D. of said pipe, and a signal indicating presence of any abnormality within said pipe wall thickness, said circuit including means recording only those reflected signals after receiving that signal reflected from said I.D. of said pipe; and means contained within said housing to record said signals as a direct relationship to the location along said line of travel of said housing at the time said signals are reflected.

8. Apparatus of claim 7 wherein said transducers are located adjacent the trailing end of said housing.

9. Apparatus of claim 7 wherein said transducer means comprises:

a first plurality of ultrasonic transducers circumferentially spaced about said housing and oriented to transmit energy pulses at one angle into said pipe to detect substantially transverse flaws or defects in said pipe;

a second plurality of ultrasonic transducers spaced about said housing and oriented to transmit energy pulses at another angle into said pipe to detect substantially longitudinal flaws or defects in said pipe; and a third plurality of ultrasonic transducers spaced about said housing and oriented to transmit ultrasonic energy pulses angularly into said pipe to detect flaws in said pipe other than substantially transverse or substantially longitudinal.

* * * * *